Patented Dec. 16, 1947

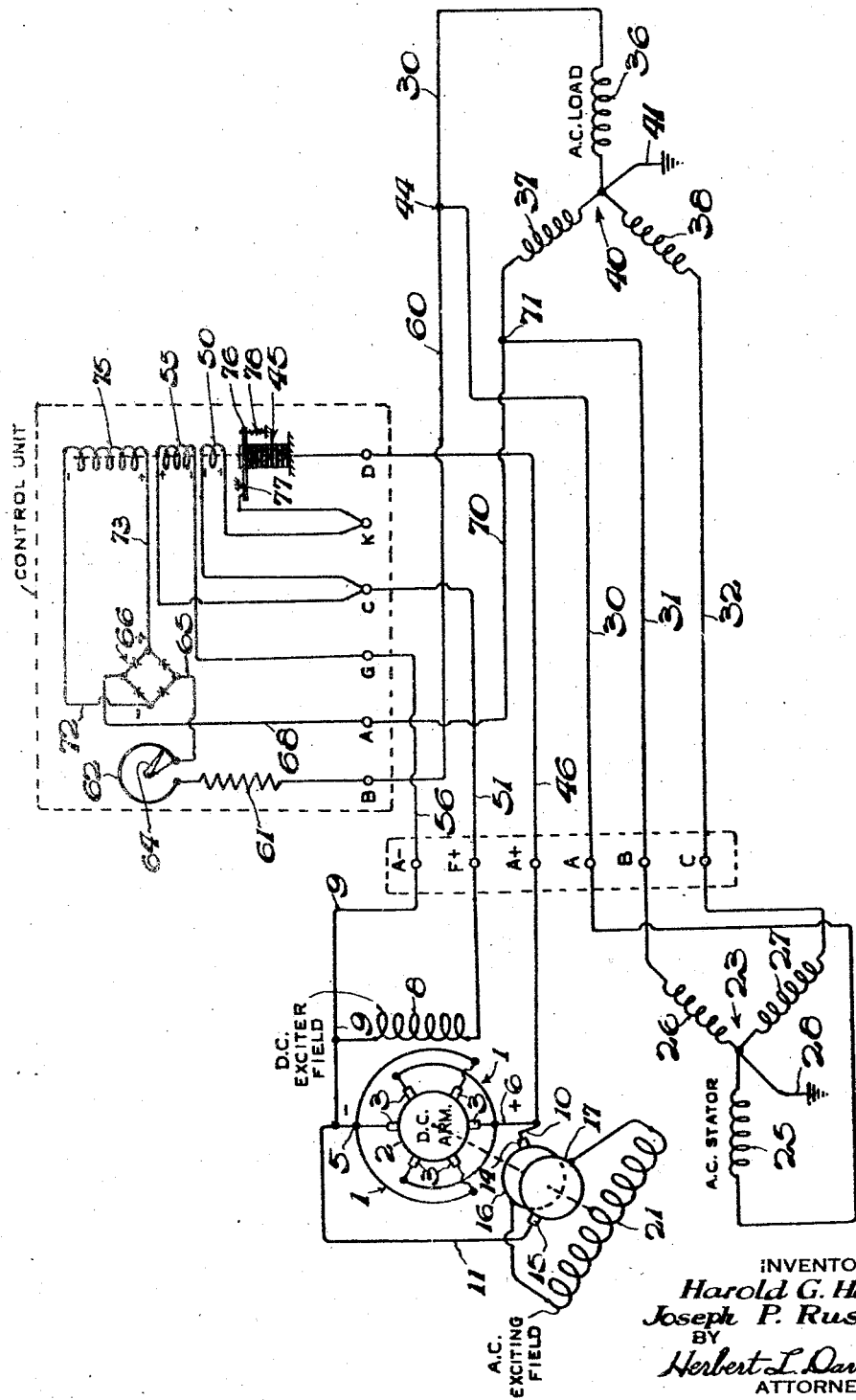

2,432,884

UNITED STATES PATENT OFFICE 2,432,884

ELECTRICAL REGULATOR

Harold G. Haas, Belleville, and Joseph P. Russo, Bloomfield, N. J., assignors to Bendix Aviation Corporation, Teterboro, N. J., a corporation of Delaware Application January 23, 1945, Serial No. 574,113

1 Claim. (Cl. 171—229)

Our present invention relates to electrical regulators and more particularly to a novel electrical system whereby hunting of the regulator may be reduced and a controlled voltage maintained at a desired value.

An object of the invention is to provide a novel voltage regulating system for maintaining constant line voltage under changing load conditions.

Another object of the invention is to provide novel means for effecting anti-hunt characteristics in a voltage regulator.

Another object of the invention is to provide novel means for utilizing in an electric device for regulating the output of a generator, the lags in the control circuit of the generator for differentially timing the follow-up and reset responses of the regulator.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claim for this purpose.

The drawing in a diagrammatic view illustrating a control system embodying one form of our invention.

In the form of the invention shown in the drawing there is provided a direct current generator of conventional type and indicated generally by the numeral 1.

The generator 1 has an armature winding, not shown, but which may be of conventional type. Connections from the armature winding lead to a commutator 2 having brushes 3 and electrical connections leading to output lines 5 and 6, to which there is applied by the generator 1 a negative and positive potential respectively. The generator 1 has an exciter field winding 8 connected at one end to the output line 5 by an electrical conductor 9 which also leads to a terminal A— of a generator set. The opposite end of the exciter field winding 8 is connected by a suitable electrical conductor to a terminal F+ of the generator set.

The output of the generator 1 is controlled by regulating the excitation of the field winding 8 in a manner which will be hereinafter explained.

The output of the direct current generator 1 is also connected through electrical conductors 10 and 11 to brushes 14 and 15 riding on slip rings 16 and 17 respectively, which may be mounted on the drive shaft of the generator 1, indicated by dotted line. The slip rings 16 and 17 are connected through electrical conductors 18 and 19 to an exciting field 21 of an alternator having stator windings indicated generally by the numeral 23. The exciting field winding 21 may be mounted on the same drive shaft as the armature 2 and may be rotated in relation to the stator windings 23 so as to induce an alternating current in the stator windings 23 having a value dependent upon the excitation of the winding 21.

The shaft for rotating the armature 2 and exciting field winding 21 may be driven through a suitable constant speed drive from the aircraft engine or other suitable power source.

The stator windings 23 may have windings 25, 26, and 27 grounded at one end thereof through electrical conductor 28.

The windings 25, 26 and 27 are connected to terminals A, B and C of the generator set and through suitable electrical conductors 30, 31 and 32 to stator windings 36, 37 and 38 respectively, of a suitable alternating current load 40, such as an alternating current motor or other suitable load means. The windings 36, 37 and 38 are grounded through an electrical conductor 41.

The excitation of the exciter field winding 8 is controlled preferably by a variable resistance carbon pile element 45 connected at one end by an electrical conductor to a terminal D of a control unit and from which terminal leads an electrical conductor 46 to the terminal A+ of the generator set. The terminal A+ is connected to the positive side of the generator through the conductor 6. The opposite end of the variable resistance 45 is connected by an electrical conductor to a terminal K of the control unit. A seond conductor leads from the terminal K to winding 50 of the control unit. The opposite end of the winding 50 is connected to a terminal C and the winding 50 is connected in series with the exciter field winding 8 through a conductor 51 leading from the terminal C to the terminal F+ of the generator set. Thus the variable resistance carbon pile element 45, winding 50, exciter field winding 8 are connected in series in a circuit leading from the conductor 6 at the positive side of the direct current generator 1 to the conductor 5 at the negative side of the direct current generator 1. Thus the winding 50 is effected by the current applied to the exciter field winding 8 and the variable resistance carbon pile element 45 is arranged to control the excitation of the exciter field winding 8, as will be explained.

There is further provided a winding 55 connected at one end to the terminal C of the control unit and at the opposite end to a terminal G of the control unit. The terminal G of the control unit is connected by an electrical conductor 56 to a terminal A— of the generator set. Thus the winding 55 is connected across the exciter field winding 8 and is effected by the voltage applied to the exciter field winding 8.

There is connected to the conductor 30 at 44, an electrical conductor 60 which leads to a terminal B of the control unit. A resistance winding 61 is connected at one end to the terminal B and at the opposite end to a variable resistance element 62 having a manually adjustable arm 64 for adjusting the resistance thereof, for calibration purposes. The arm 64 of the adjustable resistance 62 is connected through an electrical conductor 65 to a junction of a rectifier bridge 66. The opposite junction of the rectifier bridge 66 is connected through a suitable electrical conductor 68 to a terminal A of the control unit. Leading from the terminal A is an electrical conductor 70 which is connected at 71 to the conductor 31. Output conductors 72 and 73 of the rectifier bridge 66 are connected to opposite ends of a control winding 75. As to this latter arrangement, it will be readily seen that the winding 75 connected through the single phase bridge type rectifier 66 is energized in response to the voltge output across the output lines 30 and 31 of the alternator 23.

The windings 50, 55 and 75 provide electromagnetic means which are so arranged in a carbon pile regulator as to control an armature 76 and thereby the pressure applied to the carbon pile 45, as will be explained hereinafter. The regulator is shown diagrammatically in the drawing as including an armature 76 pivoted at 77 and exerting a compressive force upon the carbon pile 45 under tension of a spring 78. The spring 78 is arranged so as to balance the pull on the armature by the electromagnet 75 when energized by a line voltage having a predetermined value and is preferably of a type such as shown in the patent application Serial No. 570,002 of William G. Neild filed December 27, 1944, now U. S. Patent No. 2,427,805, granted September 23, 1947 and assigned to Bendix Aviation Corporation.

Thus as explained in greater detail in the latter application, the regulator is arranged so as to maintain a substantially constant output voltage in the lines 30, 31 and 32 under varying load conditions.

In the arrangement of the drawing, the windings 50, 55 and 75 are each arranged in relation to the carbon pile regulator so as to apply an electromagnetic force upon the armature 76 controlling the carbon pile.

The winding 75 connected across the rectifier 66 provides the main control for the carbon pile 45 and governs the regulation thereof in accordance with voltage of the lines 30 and 31.

The series winding 50 connected in series with the carbon pile 45 has a time constant different from windings 75 and 55 and reacts more rapidly than either of these windings and practically immediately on the carbon pile 45 upon a change in the energization thereof so as to tend to provide a definite low sensitivity or ratio between exciter field 8 current change and lines 30 and 31 voltage change. The winding 50 may for example have only about fifty turns of wire effecting a relatively low resistance.

The limiting action of the winding 50 is counteracted by the shunt winding 55 which provides a reset action. The winding 55 is connected across the exciter field 8. The response of the winding 55 to change in voltage across the exciter field 8 is slightly delayed and hence its reset effect on the carbon pile 45, is thus delayed. The winding 55 may have for example about five hundred turns of wire effecting a relatively greater resistance than winding 50. The winding 55 has a time constant more rapid than winding 75, but slower in response to change than winding 50.

In the form of the invention disclosed herein, the winding 50 is so arranged as to add to the electromagnetic force produced by the winding 75. However, the winding 55 is arranged to counter-balance the electromagnetic force due to the winding 50. Hence the electromagnetic force due to the winding 55 subtracts from the total due to the windings 75 and 50. The winding 55 is constructed to have a considerably larger time constant than the windings 8 and 50 together in series with the result that it does not interfere with the prompt follow-up action due to the winding 50, but provides a more gradual reset of this follow-up. The currents in the windings 50 and 55 are preferably of the order respectively of amperes and milliamperes.

Thus, it will be seen that upon an increase in the load applied to the output lines 30 and 31 the voltage will decrease, causing the electromagnet 75 to adjust the carbon pile 45 so as to decrease the latter's resistance. Such decrease in resistance will increase the current flow through the windings 50 and 55. The winding 50 being more rapid in its response to current change tends to increase the total electromagnetic force, and thereby to limit the adjustment of the carbon pile in a resistance-decreasing direction so that this follow-up action prevents the carbon pile from over-adjustment. The winding 55 more slowly responds to change of potential across the field winding 8 so as to counter-balance the effect of winding 50 causing a desirable reset action tending to free the regulator from load error. Upon a decrease in the load applied to output lines 30 and 31, an opposite action will take effect in which the windings 50 and 55 will exert a stabilizing effect.

Although only one embodiment of the invention has been illustrated and described, various changes in the forms and relative arrangements of the parts, which will now appear to those skilled in the art, may be made without departing from the scope of the invention, reference being had to the appended claim for a definition of the limits of the invention.

What is claimed is:

A line voltage regulating system for a generator supplying line current to a variable load and including an exciter field comprising, a carbon pile, an armature operatively connected thereto for varying the electrical resistance of said carbon pile, a spring biasing a portion of the armature to tend to adjust said carbon pile in a direction to produce an increase in the exciter field current, a first electromagnetic winding tending to operate the armature in the opposite direction in response to an increase in the line voltage of said generator, a second electromagnetic winding connected in series with the exciter field and quickly responsive to changes in the exciter field current, said second electromagnetic winding acting upon the armature as a follow-up promptly limiting the change of resistance of said carbon pile upon a change in the line voltage, a third electromagnetic winding connected across the exciter field winding and having a time constant substantially greater than said second winding so as to provide a slower response than said second winding and exciter field in series to change in the resistance of said carbon pile, and said third winding arranged in opposition to the first and second windings so as to substantially eliminate the stated follow-up action of said second winding in a relatively retarded manner.

HAROLD G. HAAS.
JOSEPH P. RUSSO.

REFERENCES CITED

The following references are of record in the file of this patent:

UNITED STATES PATENTS

| Number | Name | Date |
|---|---|---|
| 2,298,536 | Logan | Oct. 13, 1942 |
| 1,146,925 | Conrad | July 20, 1915 |